(12) United States Patent
Hirata et al.

(10) Patent No.: US 10,809,825 B2
(45) Date of Patent: Oct. 20, 2020

(54) CONTROL APPARATUS AND CONTROL PROGRAM FOR DETERMINING HOW A CONTROLLER DEVICE IS WORN

(71) Applicant: Sony Interactive Entertainment Inc., Tokyo (JP)

(72) Inventors: Shinichi Hirata, Kanagawa (JP);
Yoshihisa Takahashi, Saitama (JP);
Yoichi Nishimaki, Kanagawa (JP);
Yuichi Machida, Kanagawa (JP);
Kunihito Sawai, Kanagawa (JP);
Yasushi Okumura, Tokyo (JP);
Norihiro Nagai, Kanagawa (JP)

(73) Assignee: Sony Interactive Entertainment Inc., Tokyo (JP)

( * ) Notice: Subject to any disclaimer, the term of this patent is extended or adjusted under 35 U.S.C. 154(b) by 127 days.

(21) Appl. No.: 16/075,256

(22) PCT Filed: Feb. 9, 2017

(86) PCT No.: PCT/JP2017/004762
§ 371 (c)(1),
(2) Date: Aug. 3, 2018

(87) PCT Pub. No.: WO2017/150127
PCT Pub. Date: Sep. 8, 2017

(65) Prior Publication Data
US 2019/0041999 A1    Feb. 7, 2019

(30) Foreign Application Priority Data
Mar. 4, 2016    (JP) .................. 2016-042396

(51) Int. Cl.
*G06F 3/038* (2013.01)
*A63F 13/214* (2014.01)
(Continued)

(52) U.S. Cl.
CPC ............ *G06F 3/038* (2013.01); *A63F 13/213* (2014.09); *A63F 13/214* (2014.09); *A63F 13/22* (2014.09);
(Continued)

(58) Field of Classification Search
CPC . G06F 3/011; G06F 3/014; G06F 3/02; G06F 3/0202; G06F 3/021; G06F 3/0216;
(Continued)

(56) References Cited

U.S. PATENT DOCUMENTS 5,749,577 A * 5/1998 Couch .................. A63F 13/06
273/148 B
8,795,078 B1 * 8/2014 Musick, Jr. ........... G06F 3/0346
463/37
(Continued)

FOREIGN PATENT DOCUMENTS

| JP | 2006209647 A | 8/2006 |
|----|--------------|--------|
| JP | 2014032478 A | 2/2014 |
| JP | 2015141293 A | 8/2015 |

OTHER PUBLICATIONS

English translation of JP 2006-209647 (Year: 2006).*
(Continued)

*Primary Examiner* — Nathan Danielsen
(74) *Attorney, Agent, or Firm* — Matthew B. Dernier, Esq.

(57) ABSTRACT

A control apparatus is used for a device that is set up assuming that the device is worn on a user's left hand or right hand, acquires given information from the device, and determines whether the device is to be worn on the user's left hand or right hand on the basis of the given information acquired.

8 Claims, 7 Drawing Sheets

(51) Int. Cl.
    *A63F 13/22* (2014.01)
    *A63F 13/212* (2014.01)
    *A63F 13/24* (2014.01)
    *A63F 13/428* (2014.01)
    *G06F 3/0354* (2013.01)
    *G06F 3/01* (2006.01)
    *A63F 13/213* (2014.01)
    *A63F 13/26* (2014.01)
    *G06F 3/0338* (2013.01)

(52) U.S. Cl.
    CPC .............. *A63F 13/24* (2014.09); *A63F 13/26* (2014.09); *A63F 13/428* (2014.09); *G06F 3/011* (2013.01); *G06F 3/014* (2013.01); *G06F 3/0338* (2013.01); *G06F 3/03547* (2013.01); *A63F 13/212* (2014.09)

(58) Field of Classification Search
    CPC ...... G06F 3/0221; G06F 3/0227; G06F 3/033; G06F 3/0338; G06F 3/03541; G06F 3/03547–03549; G06F 3/038; G06F 3/039; G06F 2203/0332; G06F 2203/0381; A63F 13/212–2145; A63F 13/22; A63F 13/23; A63F 13/24–26; A63F 13/428

See application file for complete search history.

(56) References Cited

U.S. PATENT DOCUMENTS

2005/0093846 A1* 5/2005 Marcus ................. G06F 1/1626
                                            345/184
2015/0213580 A1 7/2015 Yamano
2017/0235365 A1* 8/2017 Siripurapu ............. G06F 3/011
                                            345/173

OTHER PUBLICATIONS

English translation of JP 2014-032478 (Year: 2014).*
International Search Report for corresponding PCT Application No. PCT/JP2017/004762, 2 pages, dated May 9, 2017.
International Preliminary Report on Patentability and Written Opinion for corresponding PCT Application No. PCT/JP2017/004762, 14 pages, dated Sep. 13, 2018.

* cited by examiner

CONTROL APPARATUS AND CONTROL PROGRAM FOR DETERMINING HOW A CONTROLLER DEVICE IS WORN

TECHNICAL FIELD

The present invention relates to a control apparatus and a control program.

BACKGROUND ART

Controller devices of home gaming consoles and so on detect a user's action such as pressing a button or swinging the device and send information indicating the user's action to the main bodies of the gaming consoles and so on.

Of these controllers, there are some controllers which are incorporated an acceleration sensor and detect and output the timing at which and the magnitude of force with which the controller is being swung when a user performs an action of swinging the device itself. Also, a device that is worn on a user's hand like a glove and detects finger actions is known.

SUMMARY

Technical Problem

In the case where the above existing devices are not worn on a user's hand, however, they can only detect an action performed on the devices by the user. Also, although capable of detecting user's finger actions, a glove-like device causes a sense of discomfort because of being worn as a glove, possibly damaging the sense of immersion into games and so on.

The present invention has been devised in light of the above circumstances, and it is an object of the present invention to provide a control apparatus and a control program that can control a device capable of detecting user's finger actions while at the same time reducing the sense of discomfort felt when worn.

Solution to Problem

The present invention for solving the problem with the above example of related art is a control apparatus of a device that is set up assuming that the device is worn on a user's left hand or right hand and includes acquisition means and determination means. The acquisition means acquires given information from the device. The determination means determines whether the device is worn on the user's left hand or right hand on the basis of the given information acquired.

Advantageous Effect of Invention

According to the present invention, it is possible to detect user's finger actions, in a convenient manner, whether a device is worn on a user's left hand or right hand while at the same time reducing the sense of discomfort felt when worn.

DESCRIPTION OF EMBODIMENT

An embodiment of the present invention will be described with reference to drawings. It should be noted that, in the description given below, the size of each section, the ratio in size between the respective sections, the layout thereof, and so on are merely examples, and that examples of the embodiment of the present invention are not limited to the size, the ratio in size, and the layout illustrated or the like.

Figure 1:
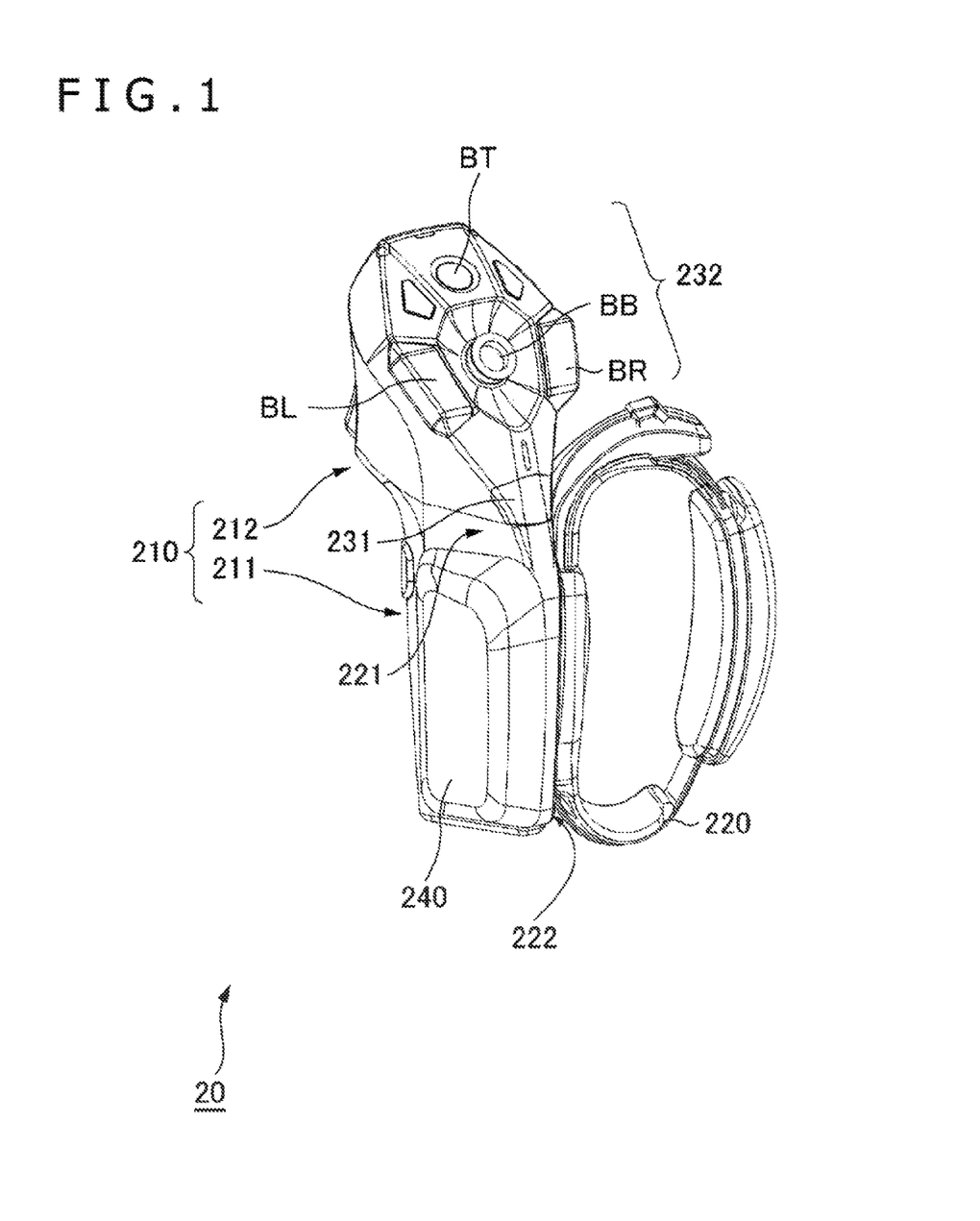
FIG. 1 is a perspective view of a device controlled by a control apparatus according to an embodiment of the present invention as seen from the front side.
Figure 2:
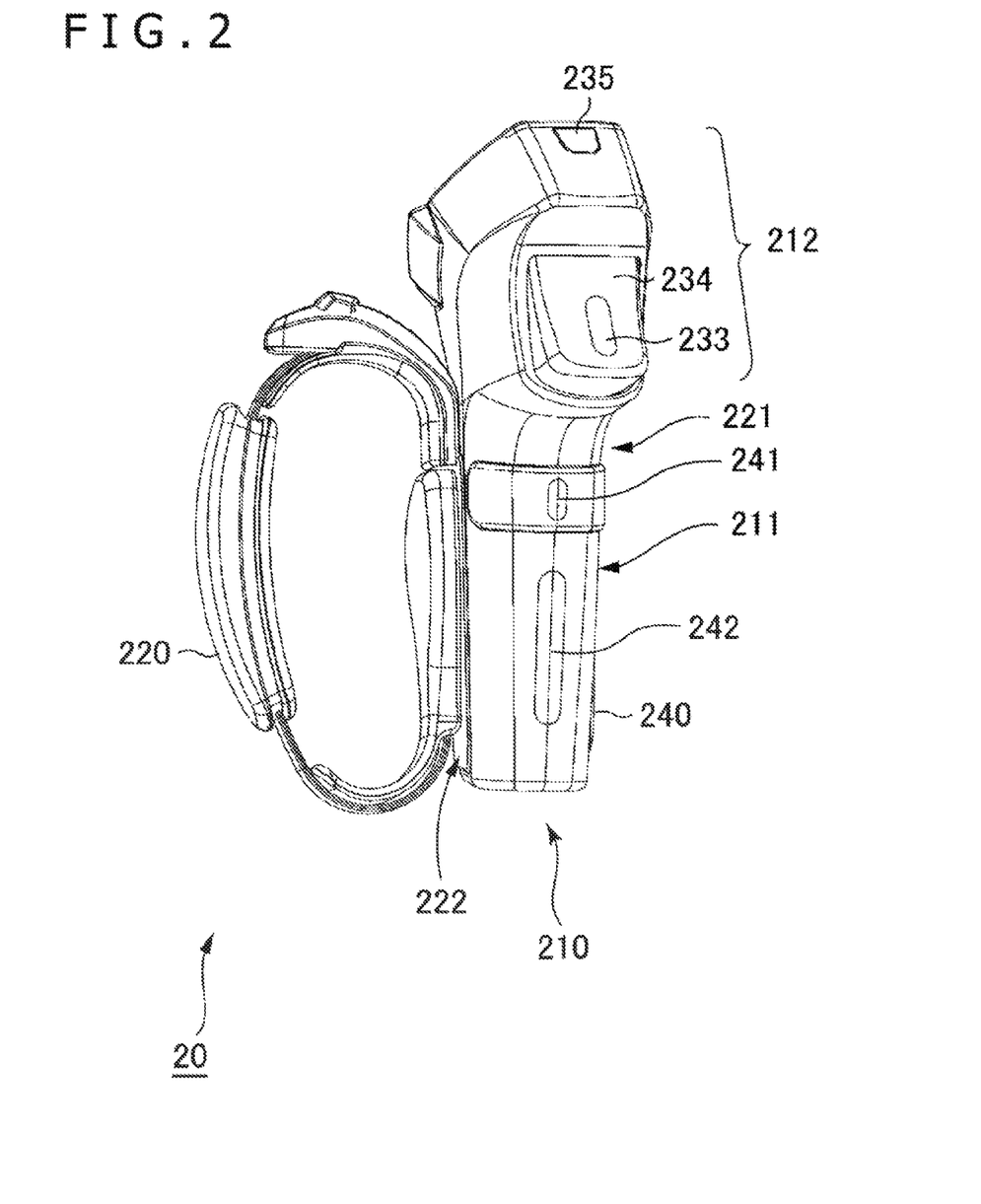
FIG. 2 is a perspective view of the device controlled by the control apparatus according to the embodiment of the present invention as seen from the rear side.

A device 20 to be controlled by a control apparatus 10 according to an example of an embodiment of the present invention is set up assuming that the device 20 is worn on a user's left hand or right hand. An example of the device 20 is something like that illustrated in FIGS. 1 and 2. FIG. 1 is a perspective view of the device 20 as seen from the front side, and FIG. 2 is a perspective view of the device 20 as seen from the rear side. In an example of the present embodiment, the device 20 includes a device main body 210 and a fixture 220, an accessory. It should be noted that the device main body 210 may be the same in shape between the case in which the device main body 210 is set up assuming that it is worn on the user's left hand and the case in which the device main body 210 is set up assuming that it is worn on the user's right hand.

The device main body 210 includes a grip section 211 gripped by the user and an operation section 212. The grip section 211 has a left side surface 221 and a right side surface 222 and is substantially in the shape of a polygonal column in an example of the present embodiment. The operation section 212 is formed continuously from the grip section 211, includes, in the example illustrated in FIGS. 1 and 2, a thumb sensor section 231 and a button operation section 232 on a front side, and a first finger sensor 233, a rocking button 234, and a display section 235 on a rear side. Also, a second finger sensor 241 and a third finger sensor 242 are provided on a rear side of the grip section 211.

The fixture 220 as an accessory may be secured to one of the left side surface 221 and the right side surface 222 of the device main body 210. Also, a battery 240 as another accessory is secured to the other of the left side surface 221 and the right side surface 222. In an example of the present embodiment, the fixture 220 is, for example, a belt with an annular portion. This belt is flexible. Also, the diameter of the annular portion is adjustable by the position where a buckle attached to the belt is locked. When secured, the belt is tightened such that the diameter of the annular portion matches the circumferential length near the base of the user's fingers. Also, when the belt is removed, the diameter of the annular portion is enlarged beyond the circumferential length near the base of the user's fingers (loosen the belt).

To use the device 20, the user passes his or her index finger through little finger through the fixture 220 and secures the device 20 at the position where the device main body 210 is in contact with the base of the user's thumb. In the example illustrated in FIGS. 1 and 2, at this time, the device 20 is secured with the right side surface 222 of the device 20 pressed against the palm of the user's hand. Also, the device 20 is sized to such an extent that when the user grips the device main body 210 in a natural manner, the distal phalanx side of the user's thumb reaches the button operation section 232 on the front side of the device 20 and the proximal phalanx side of the user's thumb approaches the thumb sensor section 231. Also, at this time, the user's index finger is located where it touches the rocking button 234 on the rear side of the device 20, and the user holds the grip section 211 firmly with his or her palm, middle finger, ring finger, and little finger. However, even if the user opens his or her hand in this condition, the device 20 is secured to the user's hand by the fixture 220, thereby preventing the device 20 from falling.

The thumb sensor section 231 is provided, for example, slightly below the position reached by the distal phalanx side of the user's thumb and provided at the position approached by the proximal phalanx side of the user's thumb when the user grips the device main body 210 in a natural manner. The thumb sensor section 231 has a detectable range of a relatively wide angle on the front side of the device 20 centered at the normal direction of the surface of the device 20 and extending from the left side surface to the right side surface on the front of the device 20 and detects the user's thumb in this detectable range. Then, the thumb sensor section 231 detects the position where the thumb was detected (angle within the above angle range) and the distance from the thumb sensor section 231 to the detected user's thumb and outputs detection result information including these pieces of information to the control apparatus 10. The thumb sensor section 231 may be a sensor of any kind such as camera, optical sensor, pyroelectric sensor, and capacitive sensor. The button operation section 232 includes at least one button and outputs, to the control apparatus 10, information identifying the button operated when the user performs a pressing operation and information indicating the fact that a button was pressed or the detail of operation such as amount of pressing.

It should be noted that at least some of the buttons of the button operation section 232 may be buttons that can be not only pressed but also tilted. In this case, when the user performs a tilting operation, the button operation section 232 outputs, to the control apparatus 10, information indicating the detail of operation such as tilting direction and amount of tilt (amount proportional to the tilting angle) together with information identifying the button operated.

Also, here, in the case where information indicating the extent to which the button was pressed in response to the pressing operation can be acquired, the button operation section 232 may output, as pressing amount information, a value between 0 and 1 as a ratio of the amount of pressing to the maximum amount of pressing with the maximum amount of pressing assumed to be '1' and the unpressed state assumed to be '0.'

The button operation section 232 outputs information regarding tilting direction and amount of tilt as follows. That is, of the button tilting directions, the button operation section 232 represents the tilting direction by assuming the direction along the longitudinal direction of the device main body 210 to be the y axis and the direction orthogonal thereto to be the x axis. The button operation section 232 also outputs a value between 0 and 1 to indicate the amount of tilt in the positive x axis direction and the amount of tilt in the negative x axis direction respectively as ratios of the tilting angles in the positive x axis direction and the negative x axis direction to the maximum amount of tilt, with the untilted state assumed to be '0' and the maximum tilting angle assumed to be '1.' The button operation section 232 also outputs a value between 0 and 1 to indicate the amounts of tilt in the positive and negative y axis directions as ratios of the tilting angles in the y axis directions to the maximum amount of tilt.

In this example, when a button is tilted by half the movable amount in the positive x axis direction and by half the movable amount in the negative y axis direction, the following information is output. That is, the output is 0.5 in the positive x axis direction, 0 in the negative x axis direction (no tilt in the negative x axis direction), 0.5 in the positive y axis direction, and 0 in the negative y axis direction (no tilt in the negative y axis direction).

The rocking button 234 swings between a protruding first position on the rear side of the device 20 and a pushed-in second position on the side of the device 20. The rocking button 234 is pushed in by the user with the index or other finger and outputs, to the control apparatus 10, information indicating the amount of pushing in. Specifically, although the rocking button 234 can include a potentiometer or other component, the rocking button 234 is not limited thereto in configuration as long as the amount of pushing in can be detected.

The display section 235 includes, for example, a light emission diode (LED) capable of emitting light in multiple colors. The display section 235 causes the LED to emit light in accordance with an instruction input from the control apparatus 10 in the manner of light emission instructed (e.g., light up in the color instructed or light up intermittently at instructed intervals).

Also, in the present embodiment, the first finger sensor 233 is attached to the rocking button 234. The first finger sensor 233 detects whether or not the index finger is touching the rocking button 234 and outputs, to the control apparatus 10, information indicating the detection result. The first finger sensor 233 can include, for example, a capacitive sensor and so on.

Further, in an example of the present embodiment, a force sense presentation apparatus may be connected to the rocking button 234. This force sense presentation apparatus presents the force that resists the pushing in of the rocking button 234 in accordance with an instruction input from the control apparatus 10. Specifically, this force sense presentation apparatus can include a motor, a linear actuator, and so on. The motor includes a rotor that rotates when the rocking button 234 is pushed in. The linear actuator has a driven body that moves linearly as the rocking button 234 is pushed in. In the case where a motor is used as described above, the force sense presentation apparatus controls the motor and the actuator such that when rotation resulting from the pushing in or movement of the driven body takes place, a force is applied in the direction opposite to the rotation or movement. A widely known apparatus is used as such a force sense presentation apparatus, and therefore a detailed description thereof is omitted here.

Further, in the present embodiment, the device 20 may present tactile sense by vibrating the device main body 210 such as vibrator, haptic device, speaker, and so on that are not illustrated and presenting the vibration to the user's hand to which the device 20 is secured. A detailed description of such a method of presenting tactile sense is also omitted here.

The second finger sensor 241 detects whether or not the user's middle finger is close to (or is touching) the grip section 211 of the device 20. Then, the second finger sensor 241 outputs information indicating the detection result to the control apparatus 10. Similarly, the third finger sensor 242 detects whether or not the user's ring finger or little finger is close to (or is touching) the grip section 211 of the device 20. Then, the third finger sensor 242 outputs information indicating the detection result to the control apparatus 10. Both the second finger sensor 241 and the third finger sensor 242 can include a capacitive sensor, an optical sensor, and so on. Here, some optical sensors available include a light emission section that emits infrared light and a light reception section that detects infrared light and measures the ratio of light that is reflected by a target and enters the light reception section to light emitted from the light emission section. According to such optical sensors, the closer the target approaches the optical sensor, the greater the ratio obtained by dividing the intensity of light entering the light reception section by the intensity of light emitted from the light emission section (referred to as the specific intensity) r, making it possible to detect the approach of a finger or other object.

Also, in the present embodiment, the device 20 includes a sensor (fixture sensor) that detects which side, the left side surface 221 or the right side surface 222, the fixture 220, an accessory, is secured to. Specifically, this fixture sensor can be realized by individually providing, on the left side surface 221 and the right side surface 222, a microswitch or other switch that turns ON when the fixture 220 is put on. As for a configuration for detecting the side to which such a given accessory is attached at the time of attachment, other widely known methods can be used in addition to the above. Therefore, a detailed description thereof is omitted here. In the present embodiment, the detection result by this fixture sensor is input to the control apparatus 10.

Figure 3:
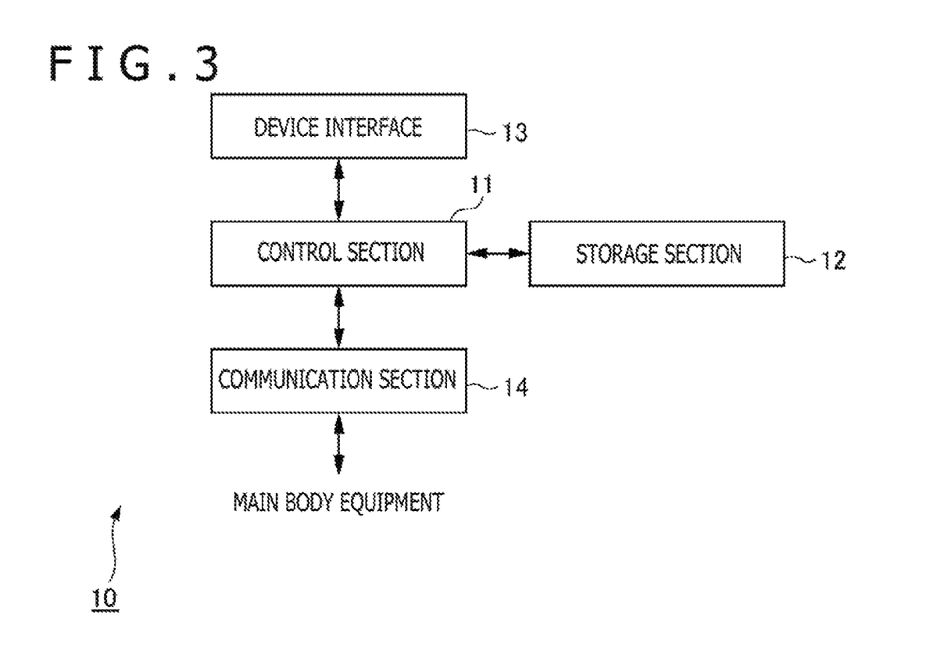
FIG. 3 is a block diagram illustrating a configuration example of the control apparatus according to the embodiment of the present invention.

The control apparatus 10 is, for example, built into the device main body 210 of the device 20. The control apparatus 10 includes a control section 11, a storage section 12, a device interface 13, and a communication section 14 as illustrated in FIG. 3. The control section 11 is a program-controlled device such as central processing unit (CPU) and operates in accordance with the program stored in the storage section 12. In the present embodiment, the control section 11 detects which of the left and right side surfaces of the device 20 a predetermined type of accessory is fitted to, and determines, on the basis of the detection result, on which hand of the user the device 20 is to be worn. Specific details of the process performed by the control section 11 will be described in detail later.

The storage section 12 is a memory device or the like and retains a program executed by the control section 11. This program may be a program provided stored in a computer-readable and non-temporary storage medium and copied to the storage section 12. Also, the storage section 12 operates as a work memory of the control section 11.

The device interface 13 is connected to the thumb sensor section 231, the button operation section 232, the first finger sensor 233, the rocking button 234, the second finger sensor 241, the third finger sensor 242, and the force sense presentation apparatus and outputs, to the control section 11, information output from the thumb sensor section 231, the button operation section 232, the first finger sensor 233, the rocking button 234, the second finger sensor 241, and the third finger sensor 242. Also, the device interface 13 outputs, to the force sense presentation apparatus, an instruction input from the control section 11.

The communication section 14 includes a serial interface such as universal serial bus (USB) or a wireless communication interface such as Bluetooth (registered trademark). The communication section 14 is connected to a piece of equipment (hereinafter referred to as main body equipment) such as home gaming console that operates on the basis of motions of the user's hand and fingers detected by the device 20 in a manner that allows communication, receiving an instruction from the main body equipment and outputting the instruction to the control section 11. Also, the communication section 14 sends information, output from the control section 11, to the main body equipment.

Figure 4:
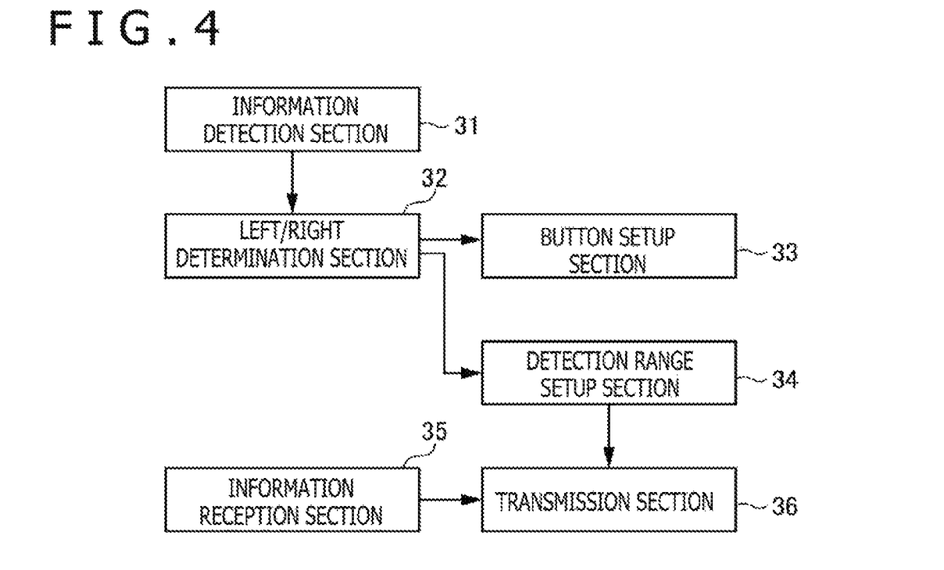
FIG. 4 is a functional block diagram illustrating an example of the control apparatus according to the embodiment of the present invention.

A description will be given here of the operation of the control section 11 of the control apparatus 10. In the present embodiment, the control section 11 functionally includes an information detection section 31, a left/right determination section 32, a button setup section 33, a detection range setup section 34, an information reception section 35, and a transmission section 36 as illustrated in FIG. 4.

The information detection section 31 accepts inputs from the fixture sensors. In an example of the present embodiment, the information detection section 31 accepts inputs of both the fixture sensor provided on the left side surface 221 and the fixture sensor provided on the right side surface 222. Then, of the outputs accepted, the information detection section 31 detects the side provided with the fixture sensor that is ON as the side to which the fixture is fitted. Specifically, when the output of the fixture sensor provided on the left side surface 221 is ON (because the fixture 220 is fitted to only one of the left side surface 221 and the right side surface 222, in this case, the output of the fixture sensor provided on the right side surface 222 is OFF), the information detection section 31 detects that the fixture is fitted to the left side surface 221. Also, when the output of the fixture sensor provided on the right side surface 222 is ON (in this case, the output of the fixture sensor provided on the left side surface 221 is OFF), the information detection section 31 detects that the fixture is fitted to the right side surface 222.

The left/right determination section 32 determines on which of the user's left and right hands the device 20 is to be worn on the basis of the detection result of the information detection section 31. Specifically, in the case where the fixture is fitted to the left side surface 221, the device 20 is to be worn on the user's left hand. Also, in the case where the fixture is fitted to the right side surface 222, the device 20 is to be worn on the user's right hand.

For this reason, the left/right determination section 32 determines that the device 20 is to be worn on the user's left hand when the information detection section 31 detects that the fixture is fitted to the left side surface 221. Also, the left/right determination section 32 determines that the device 20 is to be worn on the user's right hand when the information detection section 31 detects that the fixture is fitted to the right side surface 222.

Figure 5:
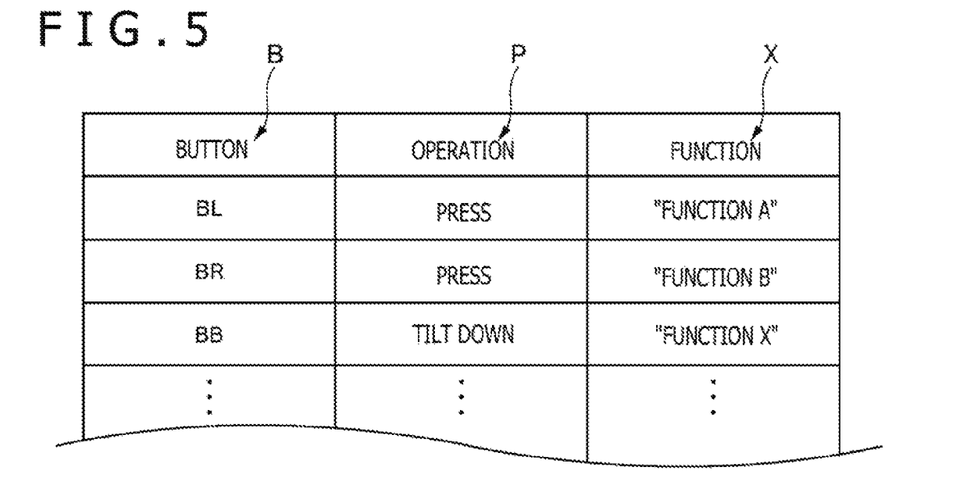
FIG. 5 is an explanatory diagram illustrating a button setup table for setting up the control apparatus according to the embodiment of the present invention.

The button setup section 33 assigns functions to the button operation section 232 and so on in accordance with an instruction and so on input from the main body equipment. Specifically, in an example of the present embodiment, as illustrated in FIG. 5, the control apparatus 10 retains in the storage section 12 information (X) to be output at the time of operation in association with each piece of information (B) identifying the button included in the button operation section 232 and with each detail of operation (P) performed on the button (e.g., for each pressing or non-pressing or for each direction of tilting or movement) as a button map. Then, the control apparatus 10 accepts information identifying the button operated from the button operation section 232 and information indicating the detail of operation, reads information to be output that is retained in association with the information accepted, and sends the information read to the main body equipment via the transmission section 36.

Also, this button map may have a combination of information indicating a tilting direction and information indicating an amount of tilt in place of information identifying a function as information (X) to be output at the time of operation. At this time, information indicating a tilting direction may be represented by assuming the direction along the longitudinal direction of the device main body 210 as the y axis and the direction orthogonal thereto as the x axis. For example, when the button is tilted in the longitudinal direction of the device main body 210 and upward (in the direction from the root to tip of the thumb, with the device main body 210 worn on the user's hand, when the thumb of the hand wearing the device main body 210 is extended), the tilting direction is the positive y axis direction, and when the button is tilted downward (in the direction along the y axis and to the side opposite the upward direction), the tilting direction is the negative y axis direction. Also, when the thumb sensor section 231 faces the user with the device main body 210 worn on the user's hand and when the button is tilted to the left of the device main body 210, the tilting direction is the negative x axis direction, and when the button is tilted in the direction along the x axis and to the side opposite the negative x axis direction, the tilting direction is the positive x axis direction. Also, in this example, when the button is pushed in, the pushing-in direction may be a positive z axis direction.

Also, in this example, with the untilted state assumed to be '0' and the maximum tilting angle assumed to be '1,' each tilting angle in the x and y axis directions is set up such that the angle should be output as a value between 0 and 1 as a ratio to the maximum amount of tilt. Similarly to the amount of pushing, the unpushed-in state assumed to be '0' and the maximum amount of pushing in assumed to be '1,' the amount of pushing in in the z axis direction is set up such that the amount should be output as a value between 0 and 1 as a ratio to the maximum amount of pushing in.

The button setup section 33 rewrites the button map illustrated in FIG. 5 in accordance with an instruction and so on input from the main body equipment. Here, instruction inputs accepted by the button setup section 33 from the main body equipment are, for example, those that indicate information identifying the buttons included in the button operation section 232, the detail of operation performed on the button identified by the information, and information to be output at the time of the operation. Here, information identifying the button is represented, for example, as being far from or close to the user's palm (distinction between the sides far from and close to the user's palm) or distinction between being on the left and right sides as one faces the front side of the device 20.

Specifically, we assume that the button operation section 232 of the device 20 includes a button BL on the left side, a button BR on the right side, a button BT on the forward side, and a button BB on the front side as one faces the front. At this time, when the home gaming console as the main body equipment issues an instruction to the control apparatus 10 of the device 20 to assign a 'function A' to the button on the side close to the user's palm and assign a 'function B' to the button on the side far from the user's palm, the control apparatus 10 performs the following operation as an operation of the button setup section 33.

That is, the button setup section 33 refers to the determination result of the left/right determination section 32 and acquires information indicating on which of the user's left and right hands the device 20 is to be worn. We assume, for example, that the left/right determination section 32 determines that the device 20 is to be worn on the user's right hand. At this time, because the button on the side close to the user's palm is the button BR on the right side as one faces the front of the device 20, the button setup section 33 records, of the button map stored in the storage section 12, information to the effect that the 'function A' has been specified in association with information indicating pressing of the button BR as information to be output. Also, at this time, because the button on the side far from the user's palm is the button BL on the left as one faces the front of the device 20, the button setup section 33 records, of the button map stored in the storage section 12, information to the effect that the 'function B' has been specified in association with information indicating pressing of the button BL as information to be output.

On the other hand, when the button setup section 33 refers to the determination result of the left/right determination section 32 and acquires information indicating which of the user's left and right hands the device 20 is to be worn on, and when the left/right determination section 32 determines that the device 20 is to be worn on the user's left hand, the button setup section 33 operates as follows. In this case, because the button on the side close to the user's palm is the button BL on the left as one faces the front of the device 20, the button setup section 33 records, of the button map stored in the storage section 12, information to the effect that the 'function A' has been specified in association with information indicating pressing of the button BL as information to be output. Also, at this time, because the button on the side far from the user's palm is the button BR on the right side as one faces the front of the device 20, the button setup section 33 records, of the button map stored in the storage section 12, information to the effect that the 'function B' has been specified in association with information indicating pressing of the button BR as information to be output.

As a result, irrespective of whether the user wears the device 20 on his or her left hand or right hand, the operation performed with the thumb detached from the palm and the operation performed with the thumb in proximity to the palm are assigned to the same function, making it possible for the user to gain natural operational feel.

It should be noted that, in these examples, the button setup section 33 sets up each function in accordance with the detail instructed from the main body equipment irrespective of the determination result by the left/right determination section 32 for those buttons located at horizontally symmetrical positions (the button BT on the forward side and the button BB on the front side in this example).

Also, in the case where an instruction is received from the main body equipment to set up a button on the basis of whether the button is on the left side or the right side as one faces the front side of the device 20 rather than whether the button is far from or close to the user's palm, the button setup section 33 of the control apparatus 10 operates as follows. As an example, when the home gaming console as the main body equipment issues an instruction to the control apparatus 10 of the device 20 to assign the 'function A' to the button on the right side as one faces the front side of the device 20 and assign the 'function B' to the button on the left side thereof, the control apparatus 10 performs the following operation as an operation of the button setup section 33.

That is, in this case, irrespective of the determination result of the left/right determination section 32, the button setup section 33 records, of the button map stored in the storage section 12, information to the effect that the 'function A' has been specified in association with information indicating pressing of the button BR on the right side as one faces the front side of the device 20 as information to be output. Similarly, the button setup section 33 records, of the button map stored in the storage section 12, information to the effect that the 'function B' has been specified in association with information indicating pressing of the button BL on the left as one faces the front side of the device 20 as information to be output.

This example is suitable for the case where the buttons of the device 20 are used as a group of buttons to instruct movements. This setup makes it possible to assign operation instructions such as leftward movement to pressing of the button on the left side as one faces the device 20 irrespective of whether the user wears the device 20 on his or her left hand or right hand.

Setting Up the Tilting Direction Axis

Also, a tilting direction axis may be set up with reference to a determination result of the left/right determination section 32. That is, when information indicating on which of the user's left and right hands the device 20 is to be worn is acquired, and when the left/right determination section 32 determines that the device 20 is to be worn on the user's left hand, and when the button is tilted in the longitudinal direction of the device main body 210 and upward (in the direction from the root to tip of the thumb, with the device main body 210 worn on the user's hand, when the thumb of the hand wearing the device main body 210 is extended), the button setup section 33 sets, in the button map stored in the storage section 12, that the tilting direction is the positive y axis direction, and when the button is tilted downward (in the direction along the y axis and to the side opposite the upward direction), the button setup section 33 sets that the tilting direction is the negative y axis direction. Also, when the thumb sensor section 231 faces the user with the device main body 210 worn on the user's hand and when the button is tilted to the left of the device main body 210, the tilting direction is the negative x axis direction, and when the button is tilted in the direction along the x axis and to the side opposite the negative x axis direction, the tilting direction is the positive x axis direction. Also, when the button is pushed in, the pushing-in direction is the positive z axis direction.

Also, when the left/right determination section 32 determines that the device 20 is to be worn on the user's right hand, the horizontal axis (x axis in this example) is inverted and treated. That is, when the left/right determination section 32 thus determines that the device 20 is to be worn on the user's right hand, and when the button is tilted in the longitudinal direction of the device main body 210 and upward (in the direction from the root to tip of the thumb, with the device main body 210 worn on the user's hand, when the thumb of the hand wearing the device main body 210 is extended), the button setup section 33 sets, in the button map stored in the storage section 12, that the tilting direction is the positive y axis direction, and when the button is tilted downward (in the direction along the y axis and to the side opposite the upward direction), the button setup section 33 sets that the tilting direction is the negative y axis direction. Also, when the thumb sensor section 231 faces the user with the device main body 210 worn on the user's hand and when the button is tilted to the left of the device main body 210, the tilting direction is the positive x axis direction, and when the button is tilted in the direction along the x axis and to the side opposite the negative x axis direction, the tilting direction is the negative x axis direction. Also, when the button is pushed in, the pushing-in direction is the positive z axis direction.

According to this example, for example, when the button BB is set up in the above manner, and when the button BB of the device 20 worn on the user's left hand is operated as follows, the device 20 outputs the following information. That is, when the user tilts the button BB to the left by half the movable amount and to the front side (downward) by half the movable amount as the user looks at the front of the button BB, the device 20 outputs information to the effect that the tilt is 0.5 in the negative x axis direction and 0.5 in the negative y axis direction. At this time, there are neither a tilt in the positive x axis direction nor a tilt in the positive y axis direction. Therefore, the device 20 may output information to the effect that each of these tilts is 0. Alternatively, there are no tilts in the first place. Therefore, the device 20 may be controlled such that these pieces of information are not output.

Also, when the user tilts the button BB of the device 20 worn on the user's right hand to the left by half the movable amount and to the front side (downward) by half the movable amount as the user looks at the front of the button BB, the device 20 outputs information to the effect that the tilt is 0.5 in the positive x axis direction and 0.5 in the negative y axis direction. At this time, there are neither a tilt in the negative x axis direction nor a tilt in the positive y axis direction. Therefore, the device 20 may output information to the effect that each of these tilts is 0. Alternatively, there are no tilts in the first place. Therefore, the device 20 may be controlled such that these pieces of information are not output.

Setting Up the Thumb Sensor

Figure 6:
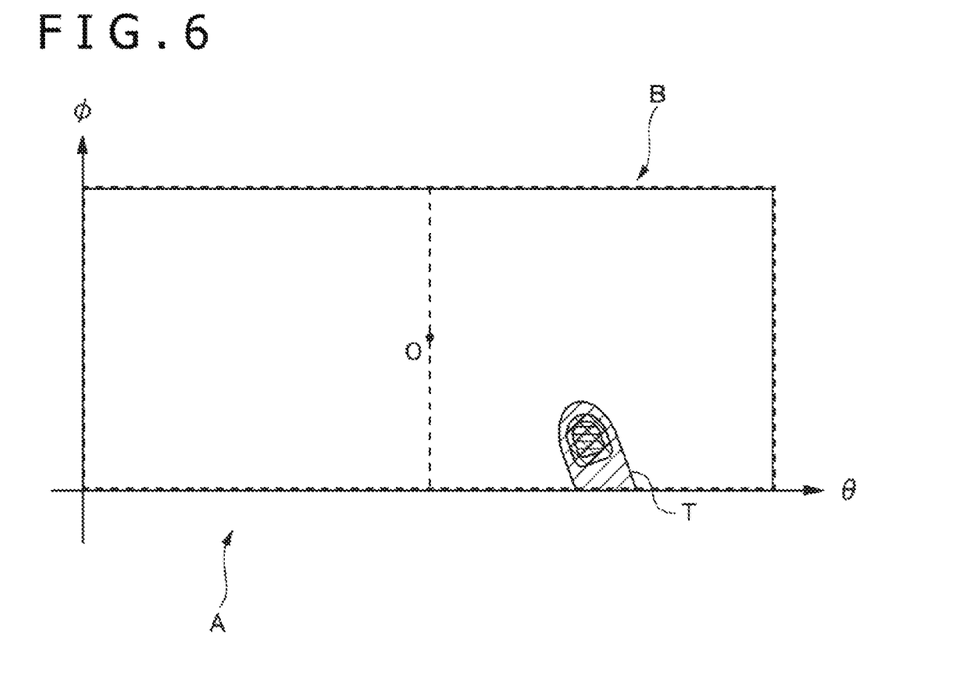
FIG. 6 is an explanatory diagram illustrating an example of thumb detection by the control apparatus according to the embodiment of the present invention.

Also, the control section 11 of the control apparatus 10 in the present embodiment accepts information input from the thumb sensor section 231 and performs the following operation as an operation of the detection range setup section 34. In an example of the present embodiment, the thumb sensor section 231 outputs, in the detectable range of a relatively wide angle on the front side of the device 20 extending from the left side surface to the right side surface on the front of the device 20, the position where the user's thumb was detected (angle within the above angle range) and the distance from the thumb sensor section 231 to the user's thumb. As an example, this output is as illustrated in FIG. 6. That is, this output includes a group of pixels arranged two-dimensionally that are represented by a horizontal detectable range $\theta$ on the front side of the device 20 (horizontal direction of the device 20) and a detectable range $\varphi$ in an elevation angle direction. The detectable range $\theta$ has a center O at the normal direction of a housing of the device 20 at the position where the thumb sensor section 231 is attached. This output is, for example, a depth map representing an area where a thumb T (user's skin surface) was detected and a distance to the thumb detected (image data having pixel value settings proportional to the distance to the thumb). FIG. 6 illustrates that the darker the color, the closer the distance.

The detection range setup section 34 refers to the determination result of the left/right determination section 32 and acquires information indicating on which of the user's left and right hands the device 20 is to be worn. Then, of the above detectable range of the thumb sensor section 231, the detection range setup section 34 sets up a thumb detection range on the basis of the information acquired. Then, of the information input from the thumb sensor section 231, the detection range setup section 34 selects only information within this detection range that has been set up for use as a thumb detection result. That is, the detection range setup section 34 varies the thumb detection range on the basis of the detection result as to on which of the user's left and right hands the device 20 is to be worn.

Figure 7:
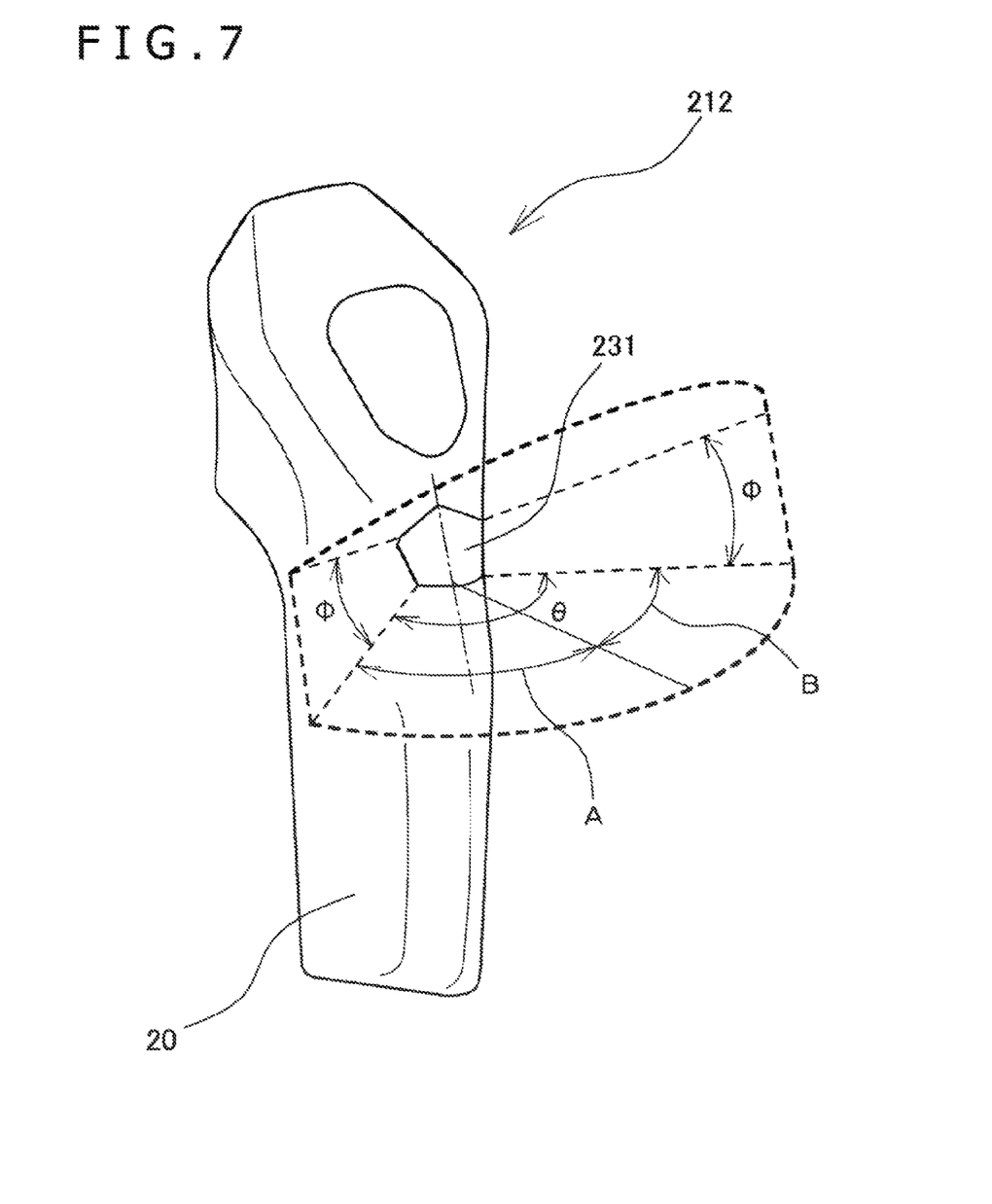
FIG. 7 is an explanatory diagram illustrating an example of a thumb detection range of the device controlled by the control apparatus according to the embodiment of the present invention.

Specifically, when determining, on the basis of the determination result of the left/right determination section 32, that the device 20 is to be worn on the user's left hand, the detection range setup section 34 specifies, of the horizontal detectable range θ of the thumb sensor section 231, half the area (area having an angle B in FIG. 7) on the right side from the front side of the device 20 (side opposite to the user's palm) as a detection range as illustrated in FIG. 7. Also, when determining, on the basis of the determination result of the left/right determination section 32, that the device 20 is to be worn on the user's right hand, the detection range setup section 34 specifies, of the horizontal detectable range θ of the thumb sensor section 231, half the area (area having an angle A in FIG. 7) on the left side from the front side of the device 20 (side opposite to the user's palm) as a detection range.

Then, of the information output from the thumb sensor section 231, the detection range setup section 34 selects and extracts information within the detection range specified here. That is, when it is determined, on the basis of the determination result of the left/right determination section 32, that the device 20 is to be worn on the user's left hand, half the area (area having the angle B in FIG. 7) on the right side from the front side of the device 20 is specified as a detection range. Therefore, the detection range setup section 34 extracts information (e.g., depth map) representing the thumb area within this detection range and the distance to the thumb and outputs the information.

Similarly, when it is determined, on the basis of the determination result of the left/right determination section 32, that the device 20 is to be worn on the user's right hand, half the area (area having the angle A in FIG. 7) on the right side from the front side of the device 20 is specified as a detection range. Therefore, the detection range setup section 34 extracts information (e.g., depth map) representing the thumb area and the distance to the thumb within this detection range and outputs the information.

This allows the thumb sensor section 231 to detect the thumb (user's skin surface) over a relatively wide-angle range, thereby preventing erroneous detection of the thenar region of the user's palm or other region as the thumb.

Also, in the example here, the thumb sensor section 231 output detection results in the entire detectable range, and the control apparatus 10 extracted some of the detection results thanks to the operation as a detection range setup section. However, the present embodiment is not limited thereto.

As an example, in the case where the thumb sensor section 231 includes a plurality of sensors having detection ranges different from each other, the detection range setup section 34 of the control apparatus 10 may vary the detection range on the basis of which sensors are to be turned ON or which sensor outputs are to be used. For example, in the case where the thumb sensor section 231 includes a first sensor having, as a detectable range, half the area (area having the angle B in FIG. 7) on the right side from the front side of the device 20 and a second sensor having, as a detectable range, half the area (area having the angle A in FIG. 7) on the left side from the front side of the device 20, the detection range setup section 34 of the control apparatus 10 may operate as follows.

In this example, when it is determined, on the basis of the determination result of the left/right determination section 32, that the device 20 is to be worn on the user's left hand, the detection range setup section 34 turns ON only the first sensor. As a result, half the area (area having the angle B in FIG. 7) on the right side from the front side of the device 20 is specified as a detection range. Therefore, the detection range setup section 34 accepts information (e.g., depth map) input representing the thumb area and the distance to the thumb within this detection range and outputs the information accepted.

Also, when it is determined, on the basis of the determination result of the left/right determination section 32, that the device 20 is to be worn on the user's right hand, the detection range setup section 34 turns ON only the second sensor. As a result, half the area (area having the angle A in FIG. 7) on the left side from the front side of the device 20 is specified as a detection range. Therefore, the detection range setup section 34 accepts information (e.g., depth map) input representing the thumb area and the distance to the thumb within this detection range and outputs the information accepted.

This also allows the thumb sensor section 231 to detect the thumb (user's skin surface) over a relatively wide-angle range, thereby preventing erroneous detection of the thenar region of the user's palm or other region as the thumb.

The information reception section 35 accepts information indicating which button was pressed or which button was moved or tilted in which direction from the button operation section 232. Also, the information reception section 35 accepts information input indicating whether or not the user's fingers were detected from the first finger sensor 233, the second finger sensor 241, and the third finger sensor 242. Further, the information reception section 35 accepts information indicating the extent to which the rocking button 234 is being pushed in by the user from the rocking button 234. The information reception section 35 then accepts information output from the detection range setup section 34. The transmission section 36 sends information, accepted by the information reception section 35, to the main body apparatus as information regarding user operation (operation-related information). Further, the control apparatus 10 of the present embodiment may output, included in operation-related information and to the main body equipment, information indicating on which of the user's left and right hands the device 20 is to be worn. Further, the control apparatus 10 of the present embodiment may output, included in this operation-related information and to the main body equipment, device identification information specific to each device 20 that is specified for the device 20 connected via the device interface 13.

Operation

The control apparatus 10 of the present embodiment is configured as described above and operates as follows. The user decides which of the left and right hands he or she will wear the device 20 on and attaches the fixture 220 to the right side surface 222 of the device 20 in the case where the device 20 will be worn on the right hand and attaches the fixture 220 to the left side surface 221 of the device 20 in the case where the device 20 will be worn on the left hand. Also, at this time, the battery 240 may be attached to the side surface opposite to that to which the fixture 220 has been attached. In this case, we assume that each terminal is provided on the left side surface 221 and the right side surface 222 of the device 20 to transfer power, supplied from the battery 240, to internal circuitry.

The control apparatus 10 accepts input from the fixture sensor that detects the fixture 220 and detects which of the left side surface 221 and the right side surface 222 the fixture is fitted to. The control apparatus 10 determines on which of the user's left and right hands the device 20 is to be worn on the basis of this detection result.

The control apparatus 10 accepts a function assignment instruction issued from the main body equipment to the button operation section 232 and so on. Specifically, when the home gaming console as the main body equipment issues an instruction to the control apparatus 10 of the device 20 to assign the 'function A' to the button on the side close to the user's palm and assign the 'function B' to the button on the side far from the user's palm, the control apparatus 10 initiates the processes illustrated in FIG. 8 and acquires information indicating on which of the user's left and right hands the device 20 is to be worn (S11).

Figure 8:
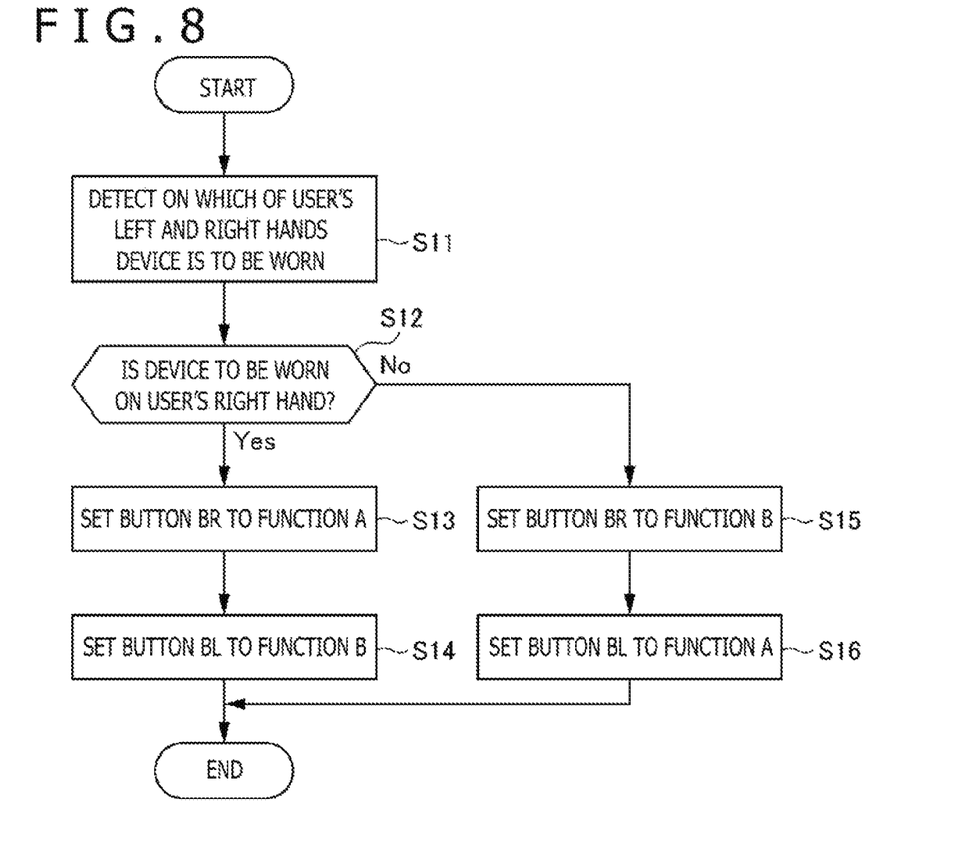
FIG. 8 is a flowchart illustrating an example of operation of the control apparatus according to the embodiment of the present invention.

The control apparatus 10 determines whether or not the device 20 is to be worn on the user's right hand (S12). Then, when the device 20 is to be worn on the user's right hand (S12: Yes), the control apparatus 10 records, of the button map stored in the storage section 12, information to the effect that the 'function A' has been specified in association with information indicating pressing of the button BR on the right side, the side close to the user's palm when the device 20 is worn on the right hand, as information to be output (S13). Also, the control apparatus 10 records information to the effect that the 'function B' has been specified in association with information indicating pressing of the button BL on the left side, the side far from the user's palm, as information to be output (S14).

In process S12, on the other hand, in the case where the device 20 is to be worn on the user's left hand (S12: No), the control apparatus 10 records, of the button map stored in the storage section 12, information to the effect that the 'function B' has been specified in association with information indicating pressing of the button BR on the right side, the side far from the user's palm when the device 20 is worn on the left hand, as information to be output (S15). Also, the control apparatus 10 records information to the effect that the 'function A' has been specified in association with information indicating pressing of the button BL on the left side, the side far from the user's palm, as information to be output (S16).

From here onward, in the device 20 to be worn on the user's right hand (whose fixture 220 is fitted to the right side surface 222), the control apparatus 10 outputs, to the main body equipment, information to the effect that the 'function B' has been specified when the button BL on the left side as one faces the device 20 is pressed. Also, when the device 20 is to be worn on the user's right hand, the control apparatus 10 outputs, to the main body equipment, information to the effect that the 'function A' has been specified when the button BL on the right side as one faces the device 20 is pressed.

The control apparatus 10 performs operation to specify the detection range of the user's thumb, for example, when the power is turned ON. Specifically, the control apparatus 10 initiates the processes illustrated in FIG. 9, for example, when the power is turned ON, and acquires information indicating which of the user's left and right hands the device 20 is to be worn on (S21).

Figure 9:
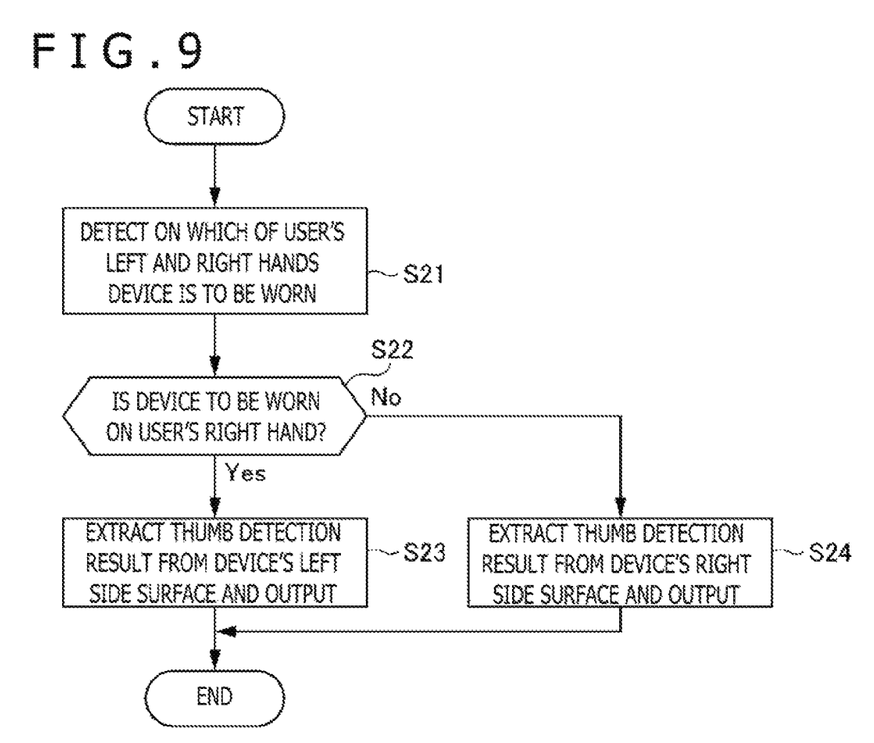
FIG. 9 is a flowchart illustrating another example of operation of the control apparatus according to the embodiment of the present invention.

The control apparatus 10 determines whether or not the device 20 is to be worn on the user's right hand (S22). Here, when the device 20 is to be worn on the user's right hand (S22: Yes), the control apparatus 10 specifies, of the horizontal detectable range θ of the thumb sensor section 231, half the area (area having the angle A in FIG. 7) on the left side from the front side of the device 20 (side opposite to the user's palm) as a detection range. Specifically, of the information output from the thumb sensor section 231, the control apparatus 10 extracts information (e.g., depth map) representing the area where the thumb was detected in half the area on the left side from the front side of the device 20, the detection range specified, and the distance to the thumb and outputs the information (S23).

On the other hand, when the device 20 is to be worn on the user's left hand (S22: No), the control apparatus 10 specifies, of the horizontal detectable range θ of the thumb sensor section 231, half the area (area having the angle B in FIG. 7) on the right side from the front side of the device 20 (side opposite to the user's palm) as a detection range. Specifically, of the information output from the thumb sensor section 231, the control apparatus 10 extracts information (e.g., depth map) representing the area where the thumb was detected in half the area (area having the angle B in FIG. 7) on the right side from the front side of the device 20, the detection range specified, and the distance to the thumb and outputs the information (S24).

Also, the control apparatus 10 outputs, to the main body equipment, information regarding the thumb detection position and the distance within the detection range specified by the processes illustrated in FIG. 9 as operation-related information. Further, the control apparatus 10 outputs, to the main body equipment, the detail of operation performed by the user on the button operation section 232 and so on as operation-related information. Also, the control apparatus 10 outputs, to the main body equipment, a detection result as to whether or not the user's finger is touching the rocking button 234 or whether the user's finger rests on the grip section 211 (whether the device 20 is grasped or the hand is open) as operation-related information.

Display

Further, in the present embodiment, the control apparatus 10 may acquire information representing on which of the user's left and right hands the device 20 is to be worn (determination result as to on which of the user's left and right hands the device 20 is to be worn) and display the information on the display section 235. As an example, in the present embodiment, the device 20 may include, in the display section 235, a first LED provided on the left side and a second LED provided on the right side as one faces the front side of the device 20, and when the device 20 is to be worn on the user's left hand, the control apparatus 10 may light up the first LED and extinguish the second LED and when the device 20 is to be worn on the user's right hand, the control apparatus 10 may light up the second LED and extinguish the first LED.

Determination Using Other Attachment

Also, although, in the description given up to here, a determination was made as to on which of the user's left and right hands the device 20 is to be worn on the basis of which of the left side surface 221 and the right side surface 222 the fixture 220 as an accessory is fitted to, the present embodiment is not limited thereto. For example, a determination may be made as to on which of the user's left and right hands the device 20 is to be worn on the basis of which of the left side surface 221 and the right side surface 222 the battery 240 as an accessory is fitted to. In this case, the battery 240 is fitted to the side different from that to which the fixture 220 is fitted. Therefore, the control apparatus 10 determines that when the battery 240 is fitted to the left side surface 221, the device 20 is to be worn on the user's right hand. Also, the control apparatus 10 determines that when the battery 240 is fitted to the right side surface 222, the device 20 is to be worn on the user's left hand.

Output of the Thumb Sensor Section

Further, although, in the description given up to here, the output of the thumb sensor section 231 was a depth map representing the thumb position in the detectable range and the distance to the thumb, the present embodiment is not limited thereto. For example, the thumb sensor section 231 may have a plurality of optical sensors. An example of such an optical sensor is that which has a light emission section that emits infrared light and a light reception section that detects infrared light and measures the ratio of light that is reflected by a target and enters the light reception section to light emitted from the light emission section. According to such an optical sensor, the closer the target approaches the optical sensor, the greater the ratio obtained by dividing the intensity of light entering the light reception section by the intensity of light emitted from the light emission section (referred to as the specific intensity) r, making it possible to detect the approach of a finger or other object. The thumb sensor section 231 in an example of the present embodiment includes a first optical sensor and a second optical sensor. The first optical sensor has half the area (area having the angle B in FIG. 7) on the right side from the front side of the device 20 as a detectable range. The second optical sensor has half the area (area having the angle A in FIG. 7) on the left side from the front side of the device 20 as a detectable range.

In this case, when it is determined that the device 20 is to be worn on the user's left hand, the control apparatus 10 turns ON only the first optical sensor. As a result, half the area (area having the angle B in FIG. 7) on the right side from the front side of the device 20 is specified as a detection range, and the thumb sensor section 231 outputs information regarding the specific intensity r output from the first optical sensor as a thumb detection result. Also, when it is determined that the device 20 is to be worn on the user's right hand, the control apparatus 10 turns ON only the second optical sensor. As a result, half the area (area having the angle A in FIG. 7) on the left side from the front side of the device 20 is specified as a detection range, and the thumb sensor section 231 outputs information regarding the specific intensity r output from the second optical sensor as a thumb detection result.

The control apparatus 10 may also determine, for example, which of the following states is true from the change in output of the thumb sensor section 231 (within the detection range specified) over time:

(1) the thumb is approaching (the distance to the thumb detected this time on the depth map is shorter than that detected previously or the specific intensity is greater than that detected previously)

(2) the thumb remains close (the difference between the distance to the thumb detected this time on the depth map and that detected previously falls within a given range or the difference between the specific intensity detected this time and that detected previously falls within a given range)

(3) the thumb is moving away (the distance to the thumb detected this time on the depth map is longer than that detected previously or the specific intensity is smaller than that detected previously)

(4) the thumb cannot be found.

In this case, the control apparatus 10 outputs the determination result to the main body equipment as output of the thumb sensor section 231 as operation-related information. When the approach of the thumb can be detected in this manner, the control apparatus 10 can, for example, make a determination that operation on the button operation section 232 will take place soon, making it possible to more flexibly respond to user operation.

Modification Example

Also, although, in the description given up to here, the control apparatus 10 was accommodated in the housing of the device 20, the present embodiment is not limited thereto. Specifically, the control apparatus 10 may be accommodated in the main body equipment connected to the device 20. In this example, the device 20 sends and outputs the outputs of the thumb sensor section 231, the button operation section 232, the first finger sensor 233, the rocking button 234, the second finger sensor 241, and the third finger sensor 242 to the control apparatus 10. Also, the control apparatus 10 outputs information representing the magnitude of the force sense to be presented to the force sense presentation apparatus of the device 20.

Key Guide Display

Then, the control apparatus 10 may output details of the button map stored in the storage section 12 by issuing an instruction to the main body equipment. This output result may be displayed and output by the main body equipment on a display monitor or other apparatus connected to the main body equipment. According to this, guidance (key guide) regarding details of functional setting for each button specified on the basis of which of the user's left and right hands the device 20 is to be worn on is displayed and output on the display monitor.

Factory Shipment Setting

Although, in an example of the present embodiment, the control apparatus 10 determined whether the device 20 was set up to be worn on the user's left hand or the right hand on the basis of which of the left and right side surfaces of the device 20 the fixture, the battery, or other accessory to be fitted to the device 20 is fitted to, the present embodiment is not limited thereto.

That is, the control apparatus 10 of the present embodiment may determine whether the device 20 is set up to be worn on the user's left hand or the right hand on the basis of given information acquired from the device 20 (e.g., not only information identifying the side surface to which an accessory is fitted to but also, for example, setup information stored in advance in a non-volatile memory included in the device 20).

Specifically, a non-volatile memory is provided in the device 20, and a setting as to whether the device 20 is to be worn on the left hand or the right hand is written to this non-volatile memory at the time of factory shipment. In this example, the control apparatus 10 reads the setting written to the non-volatile memory in the device 20 and determines whether the device 20 is set up to be worn on the user's left hand or the right hand on the basis of the setting read. It should be noted that in the case where the control apparatus 10 is built into the device 20, this non-volatile memory may be realized by the storage section 12 of the control apparatus 10. In this case, the above setting is written to the storage section 12 of the control apparatus 10 at the time of factory shipment, and the control section 11 of the control apparatus 10 determines, on the basis of the setting written to the storage section 12, whether the device 20 is set up to be worn on the left hand or the right hand.

Also, in the present embodiment, each user may be allowed to use a maximum of one device 20 set up to be worn on the left hand and one device 20 set up to be worn on the right hand on the side of the main body equipment.

In an example of the present embodiment, unique device identification information identifying each of the devices 20 is specified in association with each device 20 (for example, the device identification information is recorded in the non-volatile memory of the device 20). Then, the main body equipment stores a piece of device identification information of the device 20 set up to be worn on the left hand and a piece of device identification information of the device 20 set up to be worn on the right hand in association with each piece of user identification information.

In this example, the main body equipment initiates a registration process in response to a request for registration from the control apparatus 10 connected to the device 20 and accepts information indicating whether the device 20 connected to the control apparatus 10 is set up to be worn on the left hand or the right hand and device identification information.

When information indicating that the device 20 is set up to be worn on the left hand is input, the main body equipment attempts to record the device identification information, accepted together with the information, in association with user identification information specified separately (referred to as user identification information of interest) as information identifying the device for left hand. At this time, in the case where there is already information (existing information) that is associated with user identification information of interest as information identifying the device for left hand, the existing information is overwritten with device identification information accepted this time, or an error is reported, and the process is suspended.

Similarly, when information indicating that the device 20 is set up to be worn on the right hand is input, the main body equipment attempts to record the device identification information, accepted together with the information, in association with user identification information of interest as information identifying the device for right hand. At this time, in the case where there is already information (existing information) that is associated with user identification information of interest as information identifying the device for right hand, the existing information is overwritten with device identification information accepted this time, or an error is reported, and the process is suspended.

According to this example of processes of the main body equipment, the user can input operation to the main body equipment using the pair of devices 20 including the device main body 210 having a common shape, one of which is set up to be worn on the left hand and the other of which is set up to be worn on the right hand (normally on the left hand and the right hand respectively). Also, erroneous assignment of the plurality of devices 20, all set up to be worn on the right hand, to one user is prevented at the time of registration.

REFERENCE SIGNS LIST

10 Control apparatus, 11 Control section, 12 Storage section, 13 Device interface, 14 Communication section, 20 Device, 31 Information detection section, 32 Left/right determination section, 33 Button setup section, 34 Detection range setup section, 35 Information reception section, 36 Transmission section, 210 Device main body, 211 Grip section, 212 Operation section, 220 Fixture, 221 Left side surface, 222 Right side surface, 231 Thumb sensor section, 232 Button operation section, 233 First finger sensor, 234 Rocking button, 235 Display section, 240 Battery, 241 Second finger sensor, 242 Third finger sensor.

The invention claimed is:

1. A control apparatus of a device that is set up assuming that the device is to be worn on a user's left hand or right hand, the control apparatus comprising:
   an acquisition section adapted to acquire from the device information about a position on the device to which an accessory to the device is attached;
   a determination section adapted to determine a desired sensor detection configuration on the basis of the information acquired; and
   a detection range set up section adapted to set up a detection range for a sensor of the device based on the desired sensor detection configuration; wherein
   the device is one of a pair of such devices assigned to a user of a main equipment that can be operated by use of the devices;
   while one of the pair of devices is determined by the determination section to be worn on the user's left hand, the sensor of the other of the pair of devices has a detection range effective for the user's right hand; and
   while one of the pair of devices is determined by the determination section to be worn on the user's right hand, the sensor of the other of the pair of devices has a detection range effective for the user's left hand.

2. The control apparatus of claim 1, wherein
   the device is secured with one of left and right side surfaces thereof pressed against a palm of a user's hand, and the accessory is fitted to at least one of the left and right side surfaces of the device,
   the acquisition section acquires, of the accessories, information indicating which of the left and right side surfaces of the device a predetermined type of accessory is fitted to, and
   the determination section determines, on the basis of the detection result, on which of the user's left and right hands the device is to be worn.

3. The control apparatus of claim 2, wherein the predetermined type of accessory is a fixture worn on the side pressed against the palm and secured to the user's hand.

4. The control apparatus of claim 1, wherein
   the device has, on a front side, the sensor, which detects the user's thumb within a set detection range, and
   the detection range is varied on the basis of a result of the determination as to the desired sensor detection configuration.

5. The control apparatus of claim 4, wherein
   in the case where it is determined that the desired sensor detection configuration is for the user's left hand, the detection range is restricted to the right side from the front side of the device, and in the case where it is determined that the desired sensor detection configuration is for the user's right hand, the detection range is restricted to the left side from the front side of the device.

6. The control apparatus of claim 1, wherein
the device has buttons individually on the left and right sides, the control apparatus including:
an input section adapted to accept information input identifying functions to be assigned to the button on a side of the user's palm and the button on a side opposite to the user's palm; and
a specifying section adapted to specify the function of each of the buttons on the left side and right side of the device on the basis of a determination result as to which of the user's left and right hands the device is to be worn.

7. The control apparatus of claim 1, wherein
the device has a display section, and
a determination result as to on which of the user's left and right hands the device is to be worn is displayed on the display section.

8. A non-transitory, computer readable storage medium containing a control program for a control apparatus of a device, the device being secured with one of left and right side surfaces thereof pressed against a palm of a user's hand, and an accessory being fitted to at least one of the left and right side surfaces of the device, the control program, when executed by a computer, causes the computer to carry out actions, comprising:
acquiring from the device information about a position on the device to which the accessory is attached; and
determining, on the basis of the information acquired, a desired sensor detection configuration; and
setting up a detection range for a sensor of the device based on the desired sensor detection configuration;
wherein
the device is one of a pair of such devices assigned to a user of a main equipment that can be operated by use of the devices;
while one of the pair of devices is determined to be worn on the user's left hand, the sensor of the other of the pair of devices has a detection range effective for the user's right hand; and
while one of the pair of devices is determined to be worn on the user's right hand, the sensor of the other of the pair of devices has a detection range effective for the user's left hand.

* * * * *